June 11, 1968 E. W. ISLER 3,388,353
ELECTRICAL CONTACTOR HAVING MAIN CIRCUIT CONTROL CONTACTS AND
AUXILIARY CONTROL CONTACTS INTERCONNECTED TO BE ACTUATED FROM
A COMMON ELECTROMAGNETIC ACTUATOR
Filed Oct. 7, 1965 4 Sheets-Sheet 1

INVENTOR.
EDUARD W. ISLER
BY
Andrus & Starke
ATTORNEYS

INVENTOR.
EDUARD W. ISLER
BY
Andrus & Starke
ATTORNEYS

3,388,353
Patented June 11, 1968

1

3,388,353
ELECTRICAL CONTACTOR HAVING MAIN CIRCUIT CONTROL CONTACTS AND AUXILIARY CONTROL CONTACTS INTERCONNECTED TO BE ACTUATED FROM A COMMON ELECTROMAGNETIC ACTUATOR
Eduard W. Isler, Cleveland, Ohio, assignor, by mesne assignments, to A. O. Smith Corporation, Milwaukee, Wis., a corporation of New York
Filed Oct. 7, 1965, Ser. No. 493,824
21 Claims. (Cl. 335—132)

ABSTRACT OF THE DISCLOSURE

A contactor for an A.C. motor includes an insulating housing with exterior openings or sockets to receive a plug-in contact carrier, a plug-in magnetic actuating coil unit and a plug-in auxiliary contact. The coil unit includes a magnetic coil wound on a core and mounted within an outer opening. A resilient pad holds the coil unit in the housing. An armature forming a part of a motion transfer assembly is mounted within the housing with the armature aligned with the core of the coil unit. The armature is carried by a pivotal arm of the transfer member and is spring biased to space the armature from the core. When the coil is energized, the armature pivots the transfer member and moves a contact actuator which is carried by the transfer member. A contact carrier is mounted within the housing and includes an arm which projects through a suitable opening in the housing and which is connected to the contact actuator by a spring loaded pin and slot connection. The spring connection allows pivoting of the contact carrier to release it from the slot and pin connection for removal.

The auxiliary contacts include an outer housing from which one leg of an operating crank projects. A reciprocating actuating member is slidably mounted within the contactor housing, connected to the transfer member and includes a pair of spaced slots for interengagement with the exterior leg of the crank. When inserted in one position, the one slot engages the crank to hold the contacts in a normally closed or open condition. When the auxiliary switch is inserted in a reverse position, the normal condition of the contacts is automatically reversed.

---

This invention relates to an electrical contactor and particularly to a contactor forming a part of an alternating current motor starter unit and the like.

Electromagnetic starters are widely employed for selectively connecting and disconnecting the alternating current motor directly to suitable power supply lines for starting and stopping of the motor. The magnetic starter includes a plurality of main contacts for separately connecting each of the motor lines to the corresponding power lines and preferably includes auxiliary control contacts for controlling electromagnetic actuating means for the main contacts. In different applications, corresponding auxiliary contacts will be normally open or normally closed depending upon the particular circuit employed. Motor starters are a relatively highly developed art with continued efforts being directed to providing a compact and a readily and easily serviced unit. For example, it is desirable to have the contact assembly formed of a modulator type construction in order to permit ready servicing and the like of the movable main contacts, the auxiliary contacts, the magnetic actuating unit and the like. Basic to all of the constructions however is the requirement of maintaining reliability and long life while providing a compact and conveniently serviced unit.

The present invention is particularly directed to a contactor for motor controls and the like. Generally, in accordance with the present invention, an insulating housing, a plug-in contact carrier, a plug-in magnetic actuating coil unit and a plug-in auxiliary contact unit; all of which are readily accessible from the exterior of the unit without removal of screws and holding elements; are provided. A magnetic coil and core assembly is mounted within an outer opening and resiliently held in position through a resilient releasable connection between the assembly and the housing. For example, a preferred construction provides a suitable notch in the back side of a U-shaped core with a correspondingly resiliently loaded plate mounted within the housing and releasably mating with the notched core to hold it in position. An armature forming a part of a motion transfer assembly is mounted within the housing with the armature aligned with the core of the magnetic actuating assembly. The armature is releasably coupled to the main contact carrier and to an auxiliary switch operator to simultaneously actuate the auxiliary contacts and the main contacts. In the one embodiment, the armature is carried by an arm forming a part of a pivotally mounted transfer member which is resiliently biased to space the armature from the core. When the coil of the magnetic actuating assembly is energized, the armature pivots the transfer member and moves a contact actuator which is carried by the transfer member and positioned within the underside of the carrier contact portion of the housing. To the opposite side of the housing, a contact carrier is mounted and includes a depending actuating arm which projects through a suitable opening in the housing and is resiliently tied to the contact actuator as by a pin and slot connection. A resilient means continuously urges the contact carrier into firm engagement with the arm. However, when it is desired to remove the contact carrier with the movable contacts thereon, it is merely necessary to pivot the contact carrier to release it from the slot and pin-type connection and thus allow ready withdrawal through the corresponding opening in the housing.

The auxiliary contacts of the present invention are releasably mounted as plug-in units within outer and readily accessible recesses in the housing and include movable and fixed contacts. In a highly improved switch unit, the movable contacts are interconnected to a sliding member which in turn is connected to a two-legged crank pivotally mounted in the auxiliary contact housing. One leg of the crank projects outwardly through the auxiliary contact housing. A reciprocating actuating member is slidably mounted within the contactor housing and includes a slot or slots for interengagement with exterior legs of the crank. The actuating member is secured to the motion transfer assembly to reciprocate in response to oscillatory motion of the armature and the interconnected motion transfer assembly.

Further, in accordance with another feature, each of the actuating members is provided with properly spaced actuating slots or openings such that when the auxiliary switch is inserted in a reverse position, the normal condition of the contacts is automatically reversed. Thus, if they are normally open contacts when inserted in one position, the positioning in the reverse position will result in a normally closed condition with respect to energization of the magnetic actuating assembly.

Although described in one embodiment as including the side-by-side relationship of the magnetic actuating assembly and the contact carrier, an alternative construction provides for stacking of the main contact portion upon the actuating or coil portion of the housing with a releasable interconnection therebetween. The auxiliary contacts are mounted in the housing of the magnetic assembly and interconnected to the armature mechanism for simultaneous actuation.

It has been found that the disclosed contactor provides a very small and compact assembly of the main contactor and the auxiliary contactors while permitting ready servicing and maintenance as a result of the modular construction of the several main subassemblies.

The drawings furnished herewith illustrate embodiments of the present invention clearly disclosing the above advantages and features as well as others which will be clear from the following description.

Figure 1:
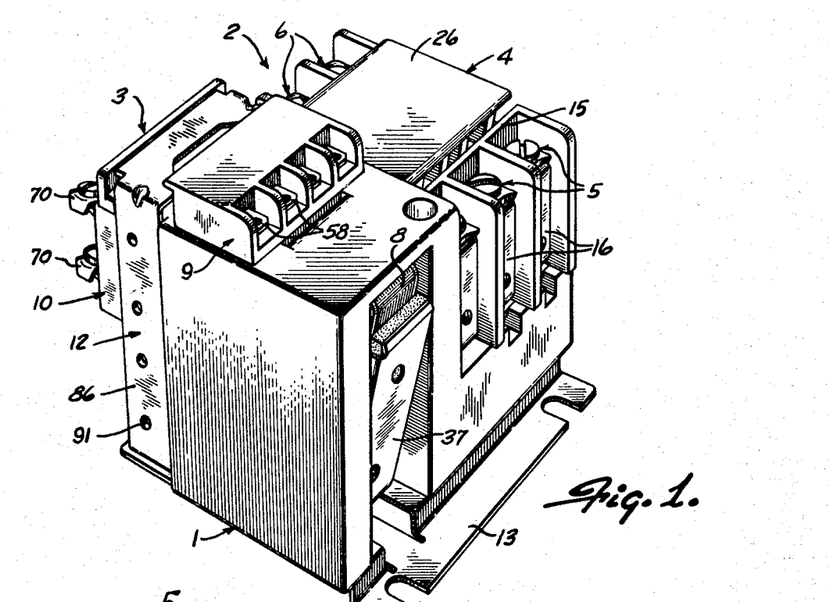
FIG. 1 is a pictorial view of a motor starter constructed in accordance with the present invention.
Figure 2:
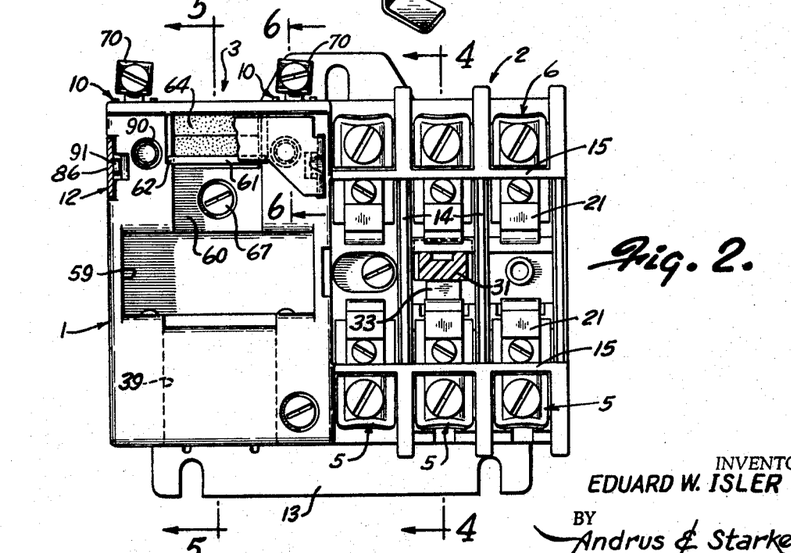
FIG. 2 is a plan view of the motor starter shown in FIG. 1 with parts broken away to show certain structural detail.
Figure 3:
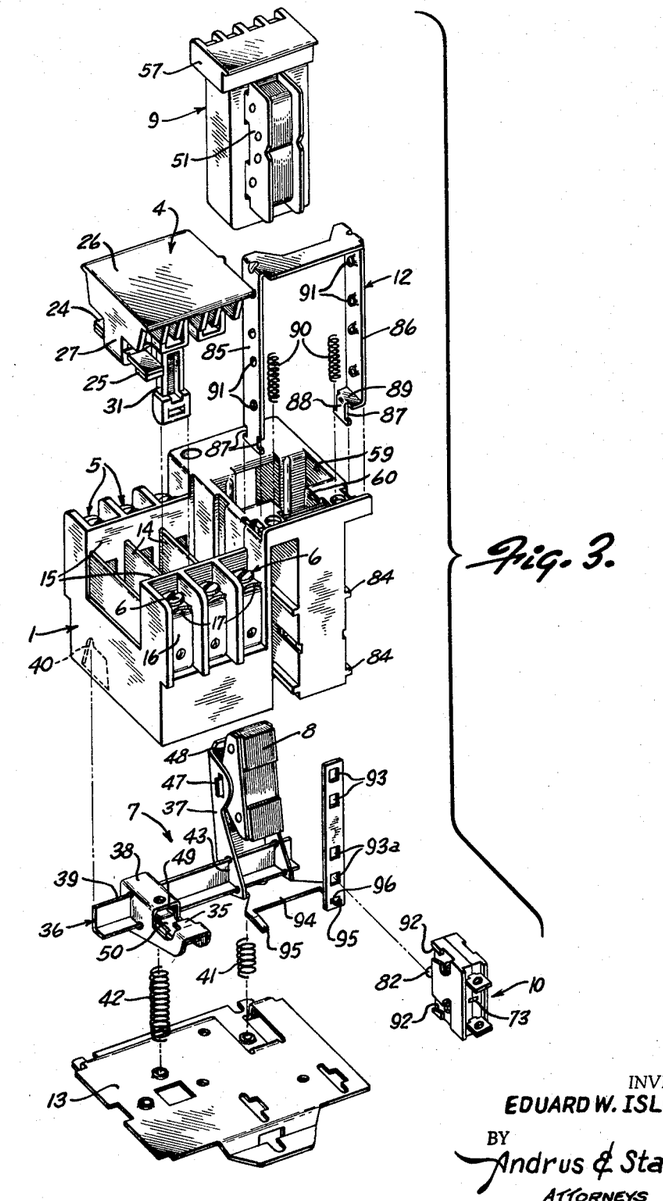
FIG. 3 is an enlarged exploded view showing the principal components of the starter shown in FIG. 1.

Referring to the drawings and particularly to FIGS. 1–3, a motor starter constructed in accordance with the present invention is illustrated including a main insulating housing 1 having a main contact portion 2 and a magnetic actuator portion 3. A movable plug-in contact carrier 4 is centrally mounted within the main contact portion 2 and is adapted to simultaneously make and break the circuit between sets of three terminals 5 and 6, each of the terminals being mounted in insulated relation to the opposite sides of the contact portion 2 and connected to the motor and power lines, not shown. A motion transfer unit 7 is pivotally mounted within the housing 1 to one side of the contact carrier 4 and is coupled at one end to the carrier 4 to cause generally reciprocal movement thereof in response to pivotal movement of the transfer unit. An armature 8 is mounted to the opposite end of the transfer unit 7 within a suitable recess in the magnetic actuating portion 3 in opposed relation to the core of a plug-in actuating coil assembly 9. Energization of the coil assembly 9 is effective to attract the armature 8 to pivot the motion transfer unit 7 and cause contact carrier 4 to move to close contacts between terminals 5 and 6, as hereinafter described. Additionally, a plurality of plug-in auxiliary switch units 10 are mounted resiliently held within outer recesses in the housing 1 immediately to the opposite sides of the actuating housing portion 3. An actuating lever 11 is slidably mounted within the housing portion 3 and connected to the motion transfer unit 7 for movement and corresponding actuation of the switch units 10 with the main contacts. The auxiliary switches 10 are releasably held within the recesses by a spring loaded retainer 12 to permit ready removal and insertion of each switch unit 10 without the necessity of removal of any bolts, screws or other fixed retaining means. Further, the motion transfer unit 7 is releasably held within the housing by a lower mounting cover 13 which in turn is secured to the housing by suitable mounting screws.

The complete assembly of the contactor can be taken apart by merely removing of the lower cover 13 and withdrawal of the motion transfer unit 7, the plug-in coil assembly 9, plug-in carrier 4 and auxiliary contact units 10 for ready repair and servicing.

In operation, the contact carrier 4 normally opens the circuit between terminals 5 and 6 of each of the three line contacts. The auxiliary switch units 10 are held in their normal standby position, which may be normally opened or normally closed. The armature 8 is spaced from the coil assembly 9. When it is desired to start the motor, the coil assembly 9 is energized to attract the armature 8 which in turn causes the contact carrier 4 to move downwardly to close the contacts between terminals 5 and 6 and simultaneously moves the levers 11 to actuate the auxiliary contactor switch units 10 which can be connected in a suitable interlock circuit to maintain the coil assembly 9 energized.

More particularly, referring to FIGS. 1–4, the contact housing portion 2 includes three separate similar sections, one for the terminals 5 and 6 in each set. Each of the sections is similarly formed and consequently the single intermediate section is described. The section is formed by a pair of side walls 14 defining the side limits of the corresponding section and interconnected by inwardly spaced opposite end walls 15 common to all three sections. End walls 15 include outwardly offset and enlarged portions about which U-shaped terminals 16 are secured with an upper arm 17 of the terminals resting on the upper portion of the enlarged wall portion and the lower arm 18 projecting inwardly beneath the enlarged portion. The arm 18 terminates between the opposite end walls 15 and the mounting wall to locate the contact or expose the contact end to the contact carrier. A stationary contact 19 is secured to the arm 18 by a suitable attachment screw 20 which extends down to the contact 19 and into a suitably tapped opening in arm 18. Terminal 16 is generally a U-shaped element having a top contact button 21 secured to the upper arm portion.

The upper arm 17 of terminal 16 includes a depending threaded hub mating with a corresponding slot within the upper surface of the enlarged portion of wall 15. A terminal clamp lug 22 is secured to the upper arm 17 of the terminal 16 by a clamping screw 23 passing downwardly therethrough and threading into the hub for releasably clamping of a line thereto. This provides a firm and positive electrical connection between the incoming lead and the terminal contact button 21. As clearly shown in FIG. 4, each of the terminals 5 and 6 includes the associated contact button 21 spaced from each other with the contact carrier 4 slidably mounted therebetween.

Figure 4:
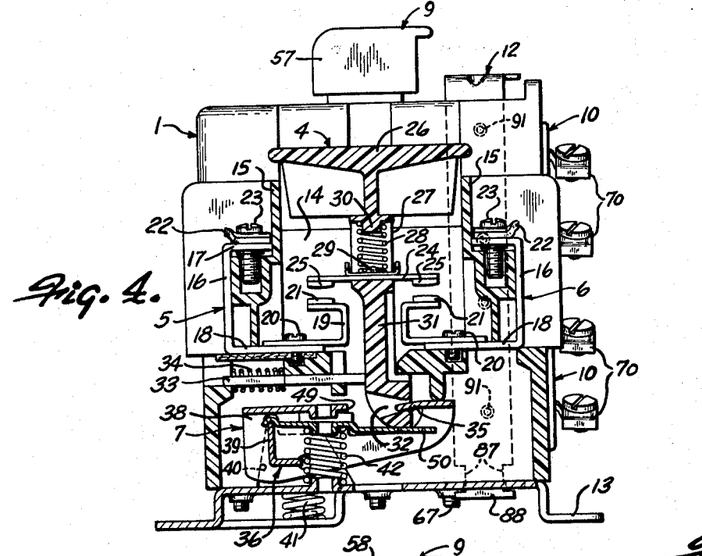
FIG. 4 is a vertical section taken on line 4—4 of FIG. 2 through the contact portion of the starter shown in FIGS. 1–3.

The contact carrier 4 supports a bridging contact 24 aligned with the contact buttons 21 of terminals 5 and 6 and having corresponding positioned contact buttons 25 on the underside thereof. The illustrated contact carrier 4 is formed of an insulating material and includes an upper flat wall 26 corresponding to the space between end walls 15. Three depending similar yokes 27 are integrally formed on the underside of wall 26 and spaced to extend inwardly between the side walls 14 of the corresponding sections. The yoke 27 defines an opening through which the corresponding bridging contact 24 extends and is resiliently held. Contact 24 extends to either side of the yoke and terminates with contact buttons aligned with the corresponding contact buttons 21 of terminals 5 and 6.

Each of the bridging contacts 24 is similarly held within the corresponding retaining yoke by a coil spring 28 acting between the back side of the bridging contact 24 and the outer base portion of the yoke 27. A spring retainer 29 is disposed between the end of the spring and the contact 24 and a suitable projection on the outer base portion 30 to hold the spring within the corresponding yoke.

Thus, by slidably moving or positioning of the contact carrier 4 within the contact housing portion, the bridging contact 24 is selectively engaged with the contacts 19 of terminals 5 and 6 to selectively break and make the circuit between the motor power lines.

The contact carrier 4 is selectively positioned by an integral positioning arm 31 which projects downwardly through a suitable opening in the transverse contact wall.

The outer end of the arm 31 is provided with an interlock opening 32 defining a hook end for releasable interconnection to the transfer motion unit 7 and positioning of carrier 4 in accordance with the energizing of the coil and core assembly 9. The arm 31 is movable laterally within the opening 32 to allow pivotal movement therein for selective interconnection and disconnection with respect to the transfer unit 7, as hereinafter developed.

A spring loaded slider 33 is slidably mounted within a lateral opening in the housing immediately above the opening 32 as viewed in FIG. 4. The slider 33 is urged into the direction of the hook end by a suitable encircling spring 34 and continuously urges the carrier to the right with the hook opening 32 engaging a lip 35 of the unit 7 to maintain a physical interconnection therebetween. Ready insertion and removal of the carrier 4 is made by pivotally moving of the carrier 4 against the force of spring 34 to disengage opening 32 from lip 35. This provides a very simple and inexpensive means for mounting and removal of the contact carrier 4 from the transfer unit 7 for servicing, maintenance and replacement.

The motion transfer unit 7 is pivotally mounted within the housing 1 and positioned in response to the energization and de-energization of the coil assembly 9.

Figure 5:
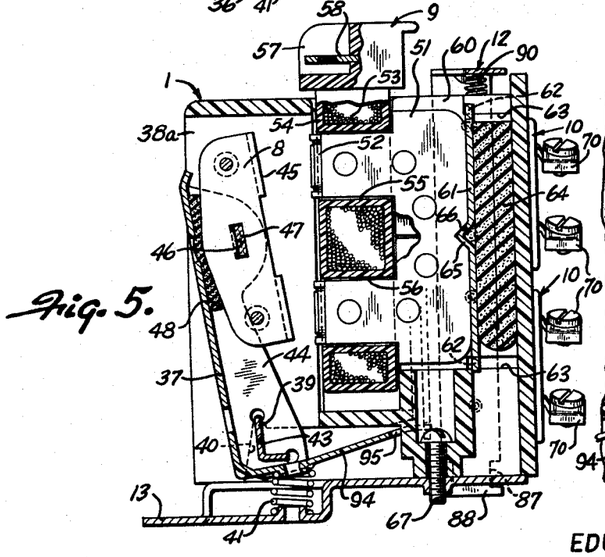
FIG. 5 is a section taken on line 5—5 of FIG. 2 and showing details of a magnetic actuating assembly.
Figure 6:
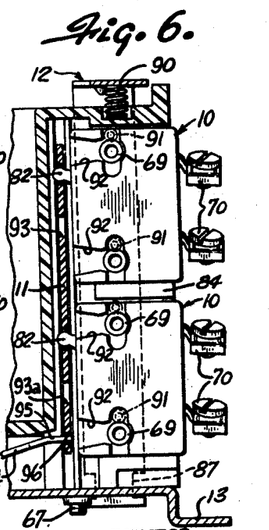
FIG. 6 is a view taken on line 6—6 of FIG. 2 to more fully show the mounting of the auxiliary contacts and the retainer therefor.

Generally, the motion transfer unit 7 includes an L-shaped channel pivot member 36 having an armature bracket 37 secured to one end and motion converter 38 secured to the opposite end. The unit 7 is mounted to one side of the carrier 4 and coil assembly 9 with bracket 37 projecting upwardly into the recess 38a, shown in FIG. 5, to properly locate the armature 8. Converter 38 projects inwardly beneath extension arm 31 into coupling engagement with the opening 32 of contact carrier 4.

The channel pivot member 36 generally has an L-shaped cross section and a pivot leg 39 is generaly parallel to the adjacent wall of the housing 1. The upper edge of leg 39 fits into inverted V-shaped grooves 40 formed in the outer end walls of the housing 1 to provide a pivotal mounting of the channel member 36. The member 36 is resiliently held in place by a pair of coil springs 41 and 42 acting between the base plate 13 and the bracket 37 and converter 38, respectively.

Bracket 37 is generally a U-shaped channel member having an L-shaped opening 43 in each of the side arms 44 corresponding to the size and shape of the pivot member 36 which projects in firm interconnection through the aligned L-shaped openings to provide for simultaneous pivoting of the armature bracket 37 with member 36. The bracket 37 projects inwardly within recess 38a in housing 1 adjacent coil assembly 9. The armature 8 is pivotally mounted between the arms in alignment with the coil assembly 9. In the illustrated embodiment of the invention, the armature 8 is a laminated core having slight outward projecting faces 45 of a rectangular cross section. A generally rectangular opening is formed centrally of the core with an inwardly projecting curved outer wall 46, shown in FIG. 5, and in alignment with correspondingly rectangular openings in the side arms of the bracket 37. A small rectangular plate 47 passes through the opening and pivotaly supports the armature for slight rocking movement on the curved surface. A foam rubber pad 48 is disposed between the base portion of bracket 37 and the armature 8 to pivotally and resiliently hold the armature. When coil assembly 9 is energized, armature 8 is attracted to and carries the interconnected channel pivot member 36 to pivot against the bias of springs 41 and 42 and actuate the converter 38.

Converter 38 is generally an inverted channel shaped member secured to the pivot member 36 by L-shaped openings provided in the side arms thereof. The converter 38 however projects from member 36 generally at right angles to the projection of the bracket 37 immediately beneath the central set of terminals 5 and 6 and terminates in alignment with the arm 31 of the contact carrier 4. The outer portion of the converter 38 has the base portion and adjacent sides removed as at 49 to define the lip 35 in the plane of the base. A small pressure plate 50 is disposed between the arms of converter 38 and spans the opening or removed portion 49. The one end of plate 50 is formed with a hook end pivotally resting on edge 39 of member 36. The coil spring 42 acts between plate 13 and the underside of plate 50 to resiliently urge inwardly toward the base of converter 38. The pressure plate 50 prevents wear on the engaging surfaces of the lip and the carrier slot. When the carrier 4 is inserted into the housing 1, the arm 31 passes through the removed portion 49 and pivots the plate 50 downwardly against the force of spring 42. When the carrier 4 is released, or manually pivoted, the lip 35 engages the carrier opening 32 and physically interconnects the elements for positioning of carrier 4.

The coil assembly 9 includes a C-shaped laminated core 51 with the pole arms spaced in accordance with the faces 45 of the armature 8. The outer ends of the arms are grooved to receive a short circuited turn 52 of a suitable conductive, nonmagnetic material such as brass. The core 51 is supported within a potted coil having a winding 53 embedded in a plastic cover or shell 54. The winding 53 is wound to define a pair of windows or openings 55 and 56 accommodating the arms of core 51 with the outer faces projecting slightly outwardly from the adjacent portion of the shell 54. The shell 54 includes an enlarged outer portion 57 having four recesses within which terminals 58 for the winding 53 are provided.

The assembly 9 is adapted to mate with a corresponding shaped opening 59 in the housing portion 3 with the C-core 51 aligned with the armature 8. The back side of the core 51 projects into a reduced portion 60 of the opening and is spaced from the adjacent wall of the housing portion 3. A locking plate 61 is resiliently mounted within the reduced portion 60 immediately to the back side of the core 51. The corners of the plate 61 include lips 62 extending into suitable guide grooves 63 in the adjacent walls for movement within the opening. Generally, plate 61 is assembled by placing it angularly within the opening immediately behind the core such that the lower lips 62 can pass therethrough and then twisting the plate to move the lips 62 into the corresponding lower and upper grooves 63.

A resilient foam rubber pad 64 is disposed between the housing 1 and the locking plate 61 and urges it into locking engagement with the back side of the core 51. A projection 65 is formed on the central portion of plate 61 and mates with a correspondingly shaped groove 66 on the back side of the core 51 to firmly and resiliently interconnect the elements.

Of substantial significance is the normal or perpendicular movement of the armature with respect to the movement of the contact carrier and particularly the contact bridging elements. This essentially eliminates the effect of vibration which may occur when the armature moves into engagement with the core when the coil is energized.

The foam backings 48 and 64 for resiliently supporting the core and coil assembly within the housing also act to absorb shock forces occasioned by movement of the armature.

When it is desired to remove the coil assembly 9, it is merely necessary to pull upwardly on the connector portion 57 with a sufficient force to overcome the holding force of the resilient pad 64. It has been found that this provides a very reliable means to support the coil assembly 9 under all operation conditions while permitting ready removal of the assembly for servicing and maintenance.

The motion transfer unit 7 is spring loaded to a normal standby position with the armature 8 spaced from the C-shaped core 51 by the loading spring 41. The cover or plate 13 is held in place by suitable attachment screws 67 to compress the locating spring 41 and continuously resiliently bias the transfer unit 7 to pivot the members with the armature 8 spaced from the core 51. The carrier 4 is thereby held in the raised position of FIG. 4 and the terminals 5 and 6 are in open circuit condition. In operation, when the winding 53 of the coil assembly 9 is energized, the armature 8 will be attracted, causing the pivot member 36 to rotate about its pivot mount, in a clockwise direction as viewed in FIGS. 4 and 5. This causes the converter 38 to rotate in acorresponding clockwise direction, pulling downwardly on the contact carrier 4 and moving the contact 24 downwardly into firm bridging engagement with the contact button of the aligned terminals 5 and 6 to close the circuit.

Simultaneously with the making and breaking of the circuit between the terminals 5 and 6, the auxiliary contactors or switch units 10 are actuated.

Figures 7, 8, 9:
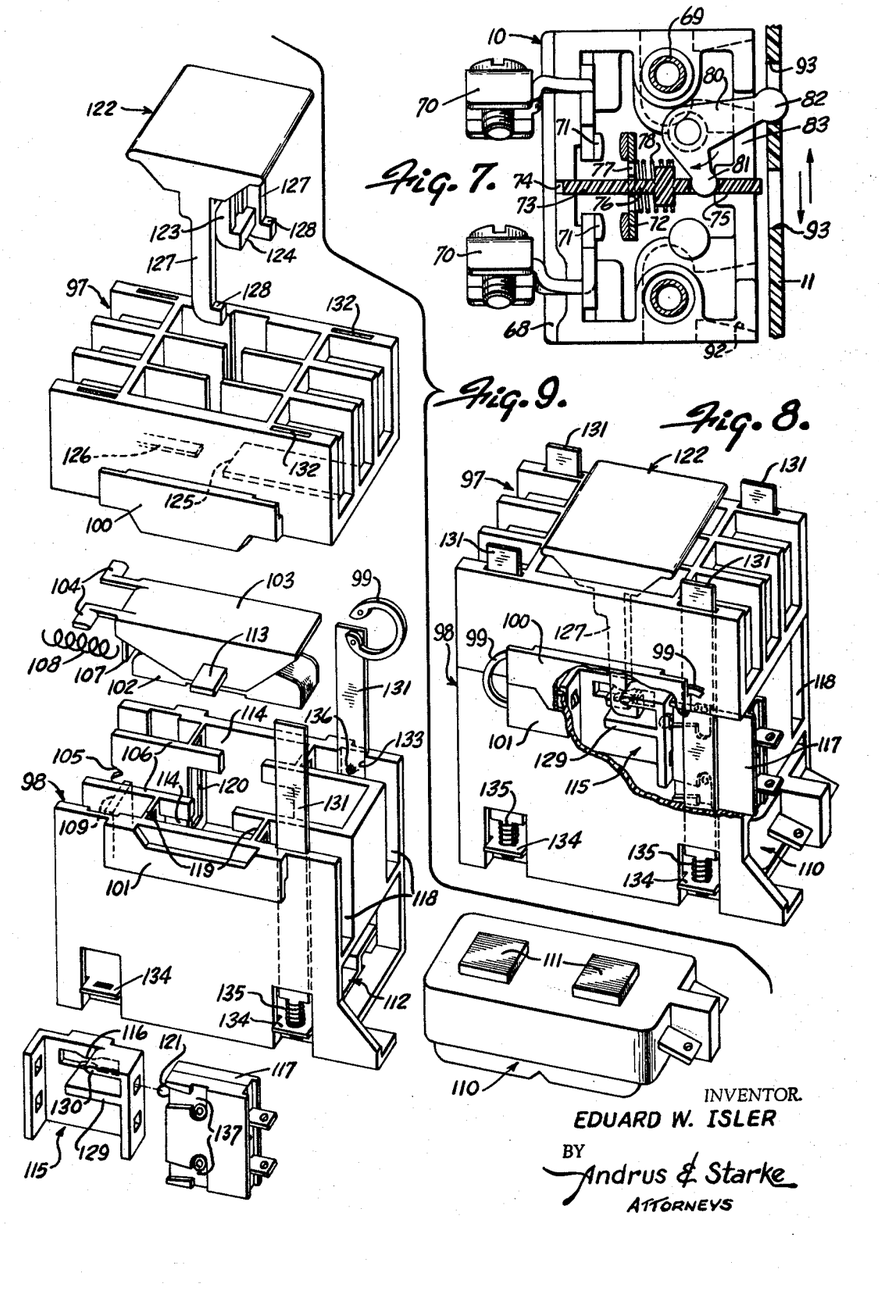
FIG. 7 is an enlarged sectional view of the auxiliary switch structure illustrating the operating mechanism therefor.
FIG. 8 is a pictorial view of an alternating embodiment.
FIG. 9 is an exploded view of the structure shown in FIG. 8.

In accordance with the illustrated embodiment of the invention, novel auxiliary switch units 10 are shown. Referring particularly to FIGS. 3 and 7, each unit 10 includes a rectangular housing 68 of suitable insulating material. Housing 68 is longitudinally split and connected by a pair of longitudinally spaced mounting tubular rivets 69 extending through corresponding openings. A pair of terminals 70 is secured to one of the narrow edges of the rectangular housing 68 and each terminates in a fixed contact 71 within the housing. A bridge contact 72 is carried by a slider 73 and spans the fixed contacts 71. By proper positioning of the insulating slider 73, the bridge contact 72 will make and break the circuit between the fixed contacts 71. The slider 73 is a small plate-like member slidably supported at the opposite ends in slots 74 and 75 between the fixed contacts 71 and in the opposite walls of the housing 67. The central portion of the slider 73 is reduced as at 76 and extends through an appropriate opening 77 in contact 72. The opening 77 is approximately as wide as a reduced portion of the slider and somewhat longer. Consequently, in assembly the slider 73 is passed through the slot and then rotated to the position of FIG. 7. A coil spring 78 encircles the slider 73 and is secured at one end to an enlargement to the back side of the contact bridge and in the illustrated embodiment immediately adjacent the rear portion of the reduced portion 76. The opposite end of the spring 78 engages the back side of the bridging contact 72 to resiliently urge it toward the fixed contacts 71. The movable contact 72 is selectively positioned into and out of engagement with the fixed contacts 71 by the operation of a small right angle crank 80 pivotally supported at the apex within the housing. One end 81 of the crank 80 terminates in an approximately formed slot or opening in the slider 73. The opposite arm or end 82 extends at right angles from the first arm and outwardly through an appropriate enlarged longitudinal slot 83 in the outer end wall of the housing 68.

The auxiliary contact units 10 are releasably mounted within correspondingly shaped recesses or slots formed in the magnetic actuating housing portion 3 and immediately to the opposite sides of the opening 60. In the illustrated embodiment of the invention, the housing 1 is constructed to accommodate four of the auxiliary switch units 10, which are mounted in stacked pairs within appropriate openings one to each side of the opening 60 in stacked relation. An intermediate ledge 84 is provided in each opening to define a pair of stacked chambers, one for each of the stacked switch units 10.

The switch units 10 are resiliently held within the openings by the spring loaded retainer 12.

Generally, retainer 12 is a U-shaped metal strap telescoped over the contact housing portion 3. One leg 85 projects downwardly through an opening in the housing and the opposite leg 86 projects through an outer wall recess. The lower end of the leg 85 is notched on the opposite edges as at 87 to form a mechanical interlock with a complementing portion of the housing. The lower end of leg 86 is provided with an L-shaped bend 88 extending inwardly immediately adjacent the bottom of the housing to releasably lock the retainer 12 to the housing 1. The length of the retainer legs 85 and 86 is somewhat longer than that of the housing and the retainer is urged upwardly with the offset ledge 89 defined by the bend in leg 86 engaging the underside of the housing 1 by a pair of biasing coil springs 90 acting between the top web portion of the retainer 12 and the aligned portion of the housing portion 1.

Each of the side legs 85 and 86 includes similar bayonet pins 91 which project inwardly thereof. Each auxiliary switch unit 10 includes an L-shaped socket 92 on the outer faces and located to receive a pin 91 to firmly hold the switch units in position when the retainer 12 is in the fully expanded position. When it is desired to remove an auxiliary switch unit 10, the retainer 12 is depressed to align the pins 91 with the entrance portion of the bayonet sockets 92 which permit withdrawal of the auxiliary switch units 10 with the pin 91 passing through the entrance portion.

Each switch unit includes a pair of the sockets 92 to permit mounting in either of the switch openings and in the position shown, or in a reversed position rotated 180 degrees from the position shown.

In the assembled relation, the switch unit actuating arm 82 of each crank 80 is coupled to one of the actuating levers 11 which are slidably disposed within the housing 1 adjacent the innermost portion of the switch unit openings.

Each of the actuating levers 11 is similarly constructed and secured as a part of the motion transfer unit 7 and consequently one lever will be described.

Referring particularly to FIGS. 3 and 7, the lever includes an upper pair of openings 93 and a corresponding lower pair of openings 93a, one pair for the upper switch unit 10 and one pair for the lower switch unit 10. The openings 93 and 93a are longitudinally spaced to position the crank arm 82 to reverse the normal condition of the contacts when the switch unit 10 is rotated 180 degrees. Thus, when unit 10 is inserted in one position, the crank arm 82 engages the upper of the two openings 93 and is held in a normally open position. By merely reversing the switch 10 to invert the relative position of the arm 82, the crank arm 82 engages the lower of the two openings 93a and is cammed or rotated to hold the contacts in a normally closed position and moved to the open position as a result of the downward movement of the actuating lever. The auxiliary contact units 10 may thus be readily and conveniently inserted as normally closed or normally open contacts in accordance with the requirement of the particular motor circuit application.

The levers 11 are reciprocated through the interconnection to the motion transfer unit 7. A plate 94 is formed as an integral portion of the armature bracket 37 and projects inwardly beneath the coil assembly 9. The outer ends of the plate are provided with forwardly projecting ears or fingers 95 which fit into corresponding openings 96 in the lower ends of the actuating levers 11. Consequently, the pivotal movement of the motion transfer unit 7 causes levers 11 to reciprocate within the housing 1 and move the switch cranks 80 of the auxiliary switch units 10.

An alternative embodiment of the invention is shown in FIGS. 8 and 9 where the switch assembly is mounted in a vertical position with respect to the electromagnetic unit in contrast to the horizontal mounting system as shown in the first embodiment.

As in the first embodiment, the vertical mounted unit includes a contact housing 97 and an actuating housing 98. In contrast to the first embodiment however the illustrated vertical mount employs completely separate housing with the contact housing 97 secured abutting the top of the actuating housing 98 and interconnected thereto by a pair of spring clips 99. The spring clips 99 are generally C-shaped members having the ends disposed in suitable recesses on complementing side wall enlargements 100 and 101 in the lower end of the contact housing 97 and in the upper end of the actuator housing 98, respectively.

The contact housing 97 generally corresponds to the previously illustrated contact housing portion to the level of the lateral contact wall and a further detailed cross section thereof is not shown.

The actuating housing 98 is generally a multiple compartmented member having an outer configuration corresponding to the configuration of the contact housing 97. A central armature recess is provided within which an armature 102 is pivotally mounted. Generally, the vertical mounted armature includes a U-shaped supporting bracket 103 having a pair of outwardly extending pivot legs 104 mating with suitable V-shaped notches 105 in the outer edges of intermediate walls 106 of the actuating housing 98 to pivotally support the armature for angular movement through a horizontal plane. A depending or bent leg 107 between the pivot legs 104 is provided with a biasing coil spring 108 compressed between the leg and the adjacent end wall 109 immediately below notches 105. The coil spring 108 continuously biases the armature 102 to pivot outwardly of the housing 98 and thus in spaced relation to an actuating coil assembly 110 shown constructed generally similar to the previously identified coil construction. In the vertical mount, the coil assembly 110 is mounted in a horizontal direction with the pole members 111 facing upwardly in alignment with the faces of the armature 102. As in the prior embodiment the coil assembly 110 is resiliently mounted within a suitable recess 112 in the lower end of the housing 98. A bar 113 interconnects the armature 102 to the bracket 103 in a manner similar to that of the first embodiment. In the vertical mount unit, the pivot arm 113 projects laterally from the armature 102 into opposite similar actuator sockets 114, each of which releasably supports a similar actuator 115.

The actuator 115 is a channel-shaped member formed of a plastic or other suitable insulating material. The base of the actuator 115 is disposed immediately adjacent the common wall 106 of the armature recess. The base of actuator 115 includes a generally rectangular opening accommodating the arm 113 of the armature. The opening includes centrally restricted portions defined by small inwardly projecting protrusions 116 having curved facing surfaces therebetween spaced in accordance with the thickness of the armature pivot arm 113. The depth of the sockets 114 is slightly in excess of the depth of the actuators 115. When the armature 102 and the pivot arms 113 move upwardly, the actuator 115 slides upwardly to the standby position. Conversely, when the armature 102 and the pivot arm 113 drop as the result of energizing coil assembly 110, the actuator 115 returns to the normally depressed position, to opposite sides of the actuator. Auxiliary switches 117 of which only one is shown are mounted in corresponding switch recesses or sockets 118 formed in the actuating housing 98 to the opposite ends of sockets 114. A common wall 119 between the sockets 114 and 118 is provided with an elongated slot 120 extending for substantially the complete length of the common wall. The switch 117 is mounted therein with the crank 121 extending through the slot 120 and into operative engagement with an adjacent opening in a side wall of the actuator 115 which has its side walls lying immediately adjacent the common walls. The actuator 115 includes a pair of crank openings for accommodating the crank in the full line position shown or in a 180° rotated position.

As the actuator 115 moves vertically in response to movement of the armature 102, as heretofore discussed, the switch 117 is positive between the normal or standby position and the actuated position. Reverse arrangement of switch 117 provides for normally open and normally closed contacts.

To actuate the main contacts not shown in FIGS. 8 and 9, a contact carrier 122 is releasably mounted within the contact housing 97. Carrier 122 is generally similar to the carrier 4 of FIGS. 1–7 and only the differences are shown and described. In the embodiment of the invention shown in FIGS. 8 and 9, a central arm 123 extends downwardly through the corresponding central terminal section of the contact housing 97. The central arm 123 however does not include a hook but only a locking lip 124 which engages an interior wall 125 of housing 97 to mechanically lock the carrier in place. A resiliently mounted slider 126 is located within the lower portion of the contact housing 97 in the same manner as shown in FIG. 4, and engages the back side of the central arm 123 to continuously urge it into locking engagement. A pair of similar outer arms 127 of carrier 122 are aligned with the adjacent contact sections and project downwardly into sockets 114 of housing 98. Each arm 127 is an L-shaped member having a lower forwardly projecting lip or finger 128, which in the assembled position mates and engages a hook opening formed in the actuator 115 by a pair of spaced horizontal walls 129 and 130. The lower wall 129 is somewhat longer than the top wall 130 and spaced therefrom generally in accordance with the thickness of or depth of the locking fingers 128. When the carrier 122 is assembled and pivoted to effect the interlock between the central arm 123 and the housing wall 125, the side arm fingers 128 are located between the walls 129 and 130 such that all movement of the actuator 115 is transmitted directly to the carrier 122.

In this manner, the pivotal movement of the armature 102 provides for the simultaneous actuation of the auxiliary switch units 117 and the main contact carrier 122.

In the illustrated embodiment of FIGS. 8 and 9, the auxiliary contact units 117 are releasably mounted within the appropriate sockets 118 through a spring loaded clamping plate 131 which is slidably mounted within suitable openings 132 formed in the side walls of the contact housing 97 and edge notches 133 within the outer wall of the auxiliary contact sockets 118 of actuating housing 98. The lower end of plate 131 projects through an opening in a transverse wall of the actuating housing 98 in alignment with a ledge 134 and includes a reduced portion projecting through an opening in ledge 134. A coil spring 135 encircles a reduced portion of the plate 131 and acts between the plate and the ledge 134 to continuously urge the plate upwardly to provide an interlock to the adjacent switch 117 similar to that of the previous embodiment. Thus, the plate 131 is provided with inwardly projecting pins 136 for interlocking of sockets 137 in auxiliary switch unit 117 in the same manner heretofore described with respect to the first embodiment. The auxiliary contact units 117 can be removed by merely depressing the appropriate plate 131 to align the locking pins 136 with the entrance portion of the locking socket 137.

Generally, the alternate embodiment of the invention functions in the basic manner of the previous embodiment except that it is mounted with the switch housing in a vertical position relative to the electromagnetic actuating assembly 110 in contrast to the horizontal position of the electromagnetic assembly of the first embodiment. The auxiliary switch units 117 are mounted within the corresponding sockets to provide a normally closed or normally open auxiliary control contact system in accordance with the particular motor or other electrical circuit employed. The armature 102 is assembled within the contact actuating housing 98 and the contact housing 97 is then releasably secured to the top of the housing 98 by the spring clips 99. The coil assembly 110 and the carrier 122 may then be readily inserted into the appropriate openings and all electrical connections made exteriorly of the contactor. Whenever the coil assembly 110 is energized, the armature 102 pivots downwardly toward the core 110 of the coil assembly, causing movement of the arms 113. The actuator 115 is secured to the arms 113 through the slot engagement and moves in a vertical direction within the corresponding socket 114 to simultaneously close and actuate the auxiliary contact units 117 and the carrier 122 to provide the desired circuit functioning.

The present invention thus provides a small compact contactor for motor starting and the like. The contact carrier, the coil and core assembly, the auxiliary switch units and the motion transfer assembly are all readily removed and inserted as a complete module thereby minimizing and permitting rapid and ready inspection, maintenance and other servicing. The motion transfer unit is spring loaded and consequently the armature and the operator are always biased to an initial standby position essentially independently of the gravity force associated with mounting of the unit. The modular construction substantially simplifies the construction replacement. Further, it has been found that the contactor constructed in accordance with the illustrated embodiments of the invention results in a substantial reduction in the unit cost of the contactors.

Various modes of carrying out the invention are contemplated as being within the scope of the following claims particularly pointing out and distinctly claiming the subject matter which is regarded as the invention.

I claim:

1. An electromagnetic circuit controlling apparatus, comprising
    a compartmented housing assembly including a compartmented contact housing portion and an actuator housing portion, said contact portion having a plurality of side-by-side terminal portions with a central carrier opening extending therethrough and with related aligned contacts on opposite sides of said central carrier opening, said actuator housing portion including a central actuator chamber having an exterior wall opening, an armature pivotally mounted in one end of the actuator chamber,
    a coil assembly releasably mounted in the opposite end of the actuator chamber and being removable through said exterior wall opening,
    pressure means resiliently holding the coil assembly in the housing and having a selected force which permits manual insertion and removal of the coil assembly through said opening.
    a contact carrier disposed within the central opening of the contact housing portion and including bridging contacts aligned with the aligned main contacts for selective engagement and disengagement with respect thereto, said carrier being pivotal within said carrier opening,
    means in the contact housing portion to resiliently hold the carrier pivoted in one direction to resiliently lock the carrier in the housing, said carrier being removable by pivoting thereof in the opposite direction to disengage said locking means,
    a transfer mechanism connected to said armature and having a motion converter means,
    auxiliary contact units releasably mounted to the actuator housing, and
    means interconnecting said auxiliary contact units to the motion converter for simultaneous selective actuation thereof.

2. An electromagnetic circuit controlling apparatus, comprising
    a compartmented housing assembly including a compartmented contact housing portion and an actuator housing portion, said contact portion having a plurality of side-by-side terminal portions with a central carrier opening extending therethrough and with related aligned contacts on opposite sides of said central carrier opening, said actuator housing portion including a central chamber having an armature pivotally mounted in one end thereof and a coil assembly releasably mounted in the opposite end thereof,
    a carrier disposed within the central opening of the contact housing portion and including bridging contacts aligned with the aligned main contacts for selective engagement and disengagement with respect thereto,
    a transfer mechansim connected to said armature and including a motion converter,
    auxiliary contact units releasably mounted within sockets in the actuator housing, and
    means interconnecting said motion converter to said carrier and to the auxiliary contact units for simultaneous selective actuation thereof.

3. The apparatus of claim 2 wherein said carrier is supported within the central opening by said motion converter.

4. An electromagnetic circuit controlling apparatus, comprising
    a compartmented housing assembly including a compartmented contact housing portion and an actuator housing portion, said contact portion having a central carrier compartment extending therethrough and with related aligned contacts on opposite sides of said central carrier compartment, said actuator housing portion including a central chamber having an armature pivotally mounted in one end thereof and a coil assembly releasably mounted in the opposite end thereof,
    a carrier disposed within the central opening of the contact housing portion and including bridging contacts aligned with the aligned main contacts for selective engagement and disengagement with respect thereto, said carrier including an extension arm means,
    resilient means releasably engaging the carrier to pivot the carrier with the extension arms pivoting in a selected locking direction,
    a transfer mechanism pivotally mounted wtihin the housing assembly and having a bracket projecting therefrom and connected to said armature and having a motion converter within the housing assembly and positioned in accordance with the movement of the armature,
    auxiliary contact units releasably mounted within sockets in the actuator housing, and
    means releasably interconnecting said motion converter to said extension arm means of the carrier in response to pivotal locking movement of the carrier and to the auxiliary contact units for simultaneous selective actuation thereof.

5. An electromagnetic circuit controlling apparatus, comprising
    a compartmented housing unit including a compartmented contact housing portion and an actuator housing portion, said contact portion having a plurality of side-by-side terminal portions with a central compartment extending therethrough and with related aligned contacts on opposite sides of said central carrier chamber, said actuator housing portion being secured to one side of the contact portion and including a central chamber having an armature pivotally mounted in one end thereof and a coil assembly releasably mounted in the opposite end thereof and removable therefrom through an opening extending normal to the central chamber,
    a carrier pivotally disposed within the central opening of the contact housing portion and movable between a release position and lock position and including means to actuate the main contacts for selective opening and closing of the circuit therebetween,
    a transfer mechanism pivotally mounted within the housing unit and connected to said armature for selective positioning in a first position and a second position and including a motion converter disposed within the contact housing portion, and
    means interconnecting said motion converter to said carrier to support the carrier within said housing and to release the carrier in response to pivoting of the carrier to the release position, said carrier being positioned by said motion converter for respectively closing and opening of the circuit between the terminals in the first position and second position of the transfer mechanism.

6. The circuit controlling apparatus of claim 5 having a plurality of auxiliary contact sockets formed within the actuator housing portion to the opposite sides of said coil assembly, said sockets opening in an outer wall of the contact housing portion for releasably receiving correspondingly formed auxiliary contact units having a contact arm, and an auxiliary contact operator secured to said transfer mechanism and moved between first and second positions and having means for releasably coupling to the contact arm.

7. The circuit controlling apparatus of claim 6 wherein said contact operation is a reciprocating strip member having a pair of spaced openings, one of said openings registering with the contact arm with the contact unit inserted in the socket in a given position and the other of said openings registering with the contact arm with the contact unit inserted in the socket in a reverse position rotated one hundred and eighty degrees from the given position.

8. The circuit controlling apparatus of claim 5 wherein said contact carrier includes an outer plate-like wall with a central arm projecting through the central compartment, said arm terminating in a lateral hook portion having an opening, and said motion converter including a hook engaging with said opening in the locked position of the carrier.

9. In an electromagnetic circuit controlling apparatus, comprising
a compartmented rectangular housing formed of an insulating material and including a contact portion and an actuating portion integrally connected in side-by-side relation, said contact portion including an opening extending downwardly between a plurality of adjacent contact sections each of which includes main contacts mounted on opposite sides of the opening, said actuating portion having a central actuator opening extending downwardly through the corresponding portion parallel to the opening through said contact housing portion,
a coil assembly disposed within the opening in the actuating portion and having an extended portion accessible from exteriorly of the housing,
a resiliently loaded locking plate mounted within the actuator opening and frictionally supporting the assembly within the opening whereby it is removable by pulling on the extended portion,
a transfer motion unit pivotally mounted within the housing and having an armature pivotally secured as a part of the unit in alignment with the C-shaped core,
means continuously urging the transfer motion unit to pivot in a direction to space said armature from said coil assembly, said armature being attracted to the coil assembly in response to energization of said winding,
a motion converter connected to the transfer motion unit and projecting laterally beneath the contact compartments and terminating in a hook portion,
a contact carrier including a plurality of resiliently mounted contact bar members with opposite ends thereof aligned with the corresponding fixed contacts whereby inward movement of the carrier completes circuit between the fixed contacts and upward movement opens the circuit therebetween, said contact carrier having an integral depending arm aligned with the motion converter and terminating in a transverse opening whereby the lower end of the carrier can be hooked to said hook portion,
means resiliently loading the arm to resiliently urge said arm into locking engagement with said hook portion and movably support and interconnect the contact carrier upon said motion converter within the assembly, and
a plurality of auxiliary switch units adapted to be releasably mounted to the housing and coupled to the transfer motion unit for simultaneous actuation with the main contact carrier.

10. The circuit controlling apparatus of claim 9 wherein said auxiliary switch units include a rectangular housing having L-shaped locking recesses on the upper and lower side surfaces thereof and including an entrance opening extending outwardly to the back edge of the switch unit and further including a crank pivotally mounted within the switch for actuation of the switch,
said housing having switch sockets in the actuating portion to releasably receive an auxiliary switch unit with the crank projecting outwardly of the back edge of the switch unit, and
a vertically reciprocal operator secured to the transfer motion unit and located immediately adjacent the switch socket, each of said actuating bars having a pair of longitudinally spaced openings for each aligned socket, the upper of said pair engaging the crank of the aligned switch inserted in one position in the socket and the other of said pair engaging the corresponding crank with the switch rotated 180 degrees in the socket.

11. In an electromagnetic circuit controlling apparatus, comprising
a compartmented rectangular housing formed of an insulating material and including a contact portion and an actuating portion integrally connected in side-by-side relation, said contact portion including an opening extending downwardly between a plurality of adjacent contact sections each of which includes main contacts mounted on opposite sides of the opening, said actuating portion having a central T-shaped opening extending downwardly through the corresponding portion parallel to the opening through said contact housing portion and an open end wall opposite the stem of the T-shaped opening with an armature chamber therein, said actuating housing portion having exterior auxiliary contact sockets formed immediately to the opposite sides of the stem of the T-shaped opening,
the common wall between the cross bar of the T-shaped opening and the auxiliary contact sockets being provided with longitudinal slots to allow movement of members between the two chambers,
a coil assembly including a C-shaped core and a coil unit wound about the legs of the core to define an assembly generally corresponding to the T-shaped opening in the actuating portion, said coil assembly being releasably mounted within said T-shaped opening, said core having a notch in the back edge,
a locking plate resiliently mounted within the stem of the T-shaped opening and including a locking projection adapted to mate with the notch in the back side of said core,
a transfer motion unit having a pivot member pivotally mounted within the lower portion of the housing and having an armature bracket projecting upwardly through the armature recess,
an armature pivotally secured to the bracket in alignment with C-shaped core,
means continuously urging the transfer motion unit to pivot in a direction to space said armature from said coil assembly, said armature being attracted to the coil assembly in response to energization of said winding,
a converter connected to the pivot arm and projecting laterally beneath the contact compartments and terminating in a hook portion immediately below the central compartment sections of said contact sections, said converter including a pivot plate pivotally mounted on the pivot member and projecting outwardly beneath said hook portion, a coil spring acting between the base and the pivot plate and continuously urging the pivot plate upwardly into engagement with the converter and the underside of the hook portion, a contact carrier including a plurality of yoke portions spaced in accordance with said contact sections and adapted to be disposed downwardly in the various sections with the yoke portion disposed between the fixed contacts, contact bar members resiliently held within each of the yokes having the opposite ends thereof aligned with the corresponding fixed contacts whereby inward movement of the carrier will provide a complete circuit between the fixed contacts and upward movement opens the circuit therebetween, said contact carrier having an integral depending arm aligned with the motion converter and terminating in a transverse opening whereby the lower end of the carrier can be hooked to said lip, a resiliently loaded arm slidably mounted within the housing immediately above the converter and adapted to resiliently engage the back side of said depending arm to continuously urge it into locking engagement with said lip to form the sole support and interconnection of the contact carrier within the assembly, a plurality of auxiliary switch units adapted to be releasably inserted within the auxiliary contact sockets formed to the opposite side of the stem of the T-shaped opening, each of said switch units including a rectangular housing having L-shaped locking recesses on the upper and lower side surfaces thereof and including an entrance opening extending outwardly to the back edge of the socket of the switch unit and having a crank pivotally mounted within the switch for actuation of the switch with one arm of the crank projecting outwardly of the back edge of the switch unit and through said slots, and a vertically reciprocal operator secured to the transfer motion unit and located immediately adjacent the inner face of said common wall and within the cross bar portion of said T-shaped opening, each of said actuating bars having an upper pair of longitudinally spaced openings and a lower pair of longitudinally spaced openings aligned with the slot, the upper of said pair engaging the crank of the aligned switch in one position and the other of said pair engaging the corresponding crank with the switch rotated 180 degrees.

12. An electromagnetic circuit controlling apparatus, comprising a compartmented housing unit including a compartmented contact housing releasably mounted in stacked relation with an actuator housing, said contact housing having a plurality of side-by-side terminal portions with a central opening extending therethrough and with related aligned contacts on opposite sides of said central opening, said actuator housing including a central chamber aligned with the central opening and having an armature pivotally mounted in the chamber for movement in the direction of said opening and an armature positioning coil assembly releasably mounted in the opposite end of the central chamber, said coil assembly being removable through a lateral opening in said actuator housing, said actuator housing having auxiliary contact sockets to one side of the central chamber, a carrier disposed within the central opening of the contact housing and including bridging contacts aligned with the aligned main contacts for selective engagement and disengagement with respect thereto, said carrier having a pair of arms extending into the actuator housing on opposite sides of the armature, a transfer mechanism connected to said armature and including a motion converter aligned with at least one of said arms for changing said pivot movement to a rectilinear reciprocal movement, auxiliary contact units releasably mounted within the contact sockets in the actuator housing, and means interconnecting said motion converter to the aligned arm and to the auxiliary contact units for simultaneous selective actuation thereof.

13. The circuit controlling apparatus of claim 12 wherein the actuator housing includes a converter socket in the wall abutting the contact housing and having a common wall with the central chamber, said wall having an edge slot and said armature having a pivot pin protruding laterally through said opening, said motion converter comprising a sliding frame member slidably mounted within said converter socket for rectilinear movement and having an opening accommodating said pivot pin and having convex bearing surfaces on opposite sides thereof, said motion converter having a pair of spaced parallel walls defining an opening aligned with the end of the arm, and said arm having a forwardly protruding extension disposed between said parallel walls to interconnect the motion converter to the carrier.

14. The circuit controlling apparatus of claim 13 having the auxiliary contact socket immediately adjacent the converter socket with a common wall therebetween, said common wall having a slot and said frame member having a pair of openings aligned with the slot, and said auxiliary contact unit having an operating arm protruding through the slot and into one of said pair of openings depending on the insertion of the contact unit in a first position or a second position rotated 180 degrees from the first position.

15. In an electromagnetic circuit controlling apparatus, comprising a compartment rectangular housing formed of an insulating material and including a contact portion and an actuating portion releasably connected in stacked relation, said contact portion including a carrier opening extending downwardly between a plurality of adjacent contact sections each of which includes main contacts mounted on opposite sides of the opening, said actuating portion having a central actuator opening extending parallel to the carrier opening and having an actuating housing portion having centrally located converter sockets formed immediately to the opposite sides of the actuator opening with exterior auxiliary contact sockets on opposite sides of the converter sockets, the common wall between the converter sockets and the auxiliary contact sockets being provided with longitudinal slots to allow movement of members between the two chambers, a coil assembly releasably mounted within the outer end of the actuator opening, an armature pivotally mounted within the inner end of the actuator opening in alignment with the coil assembly, means continuously urging the armature in spaced relation to said coil assembly, said armature being attracted to the coil assembly in response to energization thereof, a motion converter connected to the armature and slidably disposed within the converter sockets for simultaneous movement with the armature, a contact carrier disposed within said carrier opening and having three laterally spaced integral depending arms aligned one each with the motion converters and the armature, each arm terminating in a projecting lip, contact members carried by the carrier to make and break the circuit between the related fixed contacts, a resiliently loaded arm slidably mounted within the housing immediately above the converter and adapted to resiliently engage the back side of the central depending arm to continuously urge the carrier to pivot into locking engagement with the adjacent housing to prevent directly pulling of the carrier from the housing and to move the depending arms on opposite sides thereof into operative engagement with the motion converters, and a plurality of auxiliary switch units adapted to be releasably inserted within the auxiliary contact sockets and having operating members coupled to the adjacent motion converter through the longitudinal slots in the common wall.

16. In a switching apparatus, a housing having a plurality of main contact units mounted therein and adapted to be opened and closed and having an auxiliary contact socket, an electromagnetic actuator having means connected to the main contact units for actuating said main contacts, an auxiliary contact unit mounted in either of two positions differing by 180 degrees in said socket and having an input control member similarly located in a first position within said socket with the contact unit in a first position or a second laterally spaced position within said socket with the contact unit in the second position, an auxiliary contact actuator movably mounted adjacent the contact socket along the line between said two locations of the input control member, said actuator having a pair of spaced operating means, one of which is coupled to the input control member with the auxiliary contact unit inserted in the first position and the other of which is coupled to the input control member with the auxiliary contact unit inserted in the second position, and means connecting said auxiliary contact actuator to said electromagnetic actuator for simultaneous actuation with said main contact units.

17. The switching apparatus of claim 16 wherein said socket is generally rectangular, said auxiliary contact actuator being a plate member mounted for longitudinal movement along the inner end of the socket, said plate member having a pair of spaced openings, and said contact unit includes a corresponding rectangular housing with an input arm mating with alternate openings in the first position and the second position of the contact unit.

18. In an electrical switching apparatus including a housing having a contact unit socket and a contact actuating member movable between a first and a second position, the improvement comprising a contact unit generally corresponding to said socket for releasable mounting therein and insertable therein in only two possible positions, said contact unit having an arm for releasable coupling to said member in said first position, and a pair of spaced means forming a part of said actuating member, one of said pair being coupled to the arm to hold the contact unit in a closed position with the contact unit inserted in one of the two possible positions and the other of said pair being coupled to the arm to the contact unit in an opened position with the contact unit inserted in the opposite of the two possible positions.

19. The switching apparatus of claim 18 wherein said socket and said contact unit are generally rectangularly shaped with the actuating member being movable adjacent a narrow side wall of the socket and said arm being pivotally mounted in a corresponding narrow side wall of the contact unit.

20. An electrical switching apparatus, comprising a housing unit having a plurality of sockets opening to the exterior of the housing unit, a plurality of correspondingly shaped contact units insertable one within each of the sockets from the exterior of the housing unit and insertable in each socket in only two possible positions differing by 180 degrees, said contact units having an actuating arm projecting from the innermost end wall of the contact unit, resilient means engaging the side walls of each contact unit and including manually operated means to release the means from the contact unit for insertion and removably of the corresponding contact unit, a switch actuating mechanism movably mounted within the housing between a first position and a second position and having a rectilinearly positioned actuator disposed in the position of each of said arms of the contact units, and each of said actuators including a pair of coupling means spaced in the direction of movement of the actuator and located with the one coupling means engaging the arm with the contact unit in one of the two possible positions and with the other coupling means engaging the arm with the contact unit in the other of the two possible positions.

21. The electrical switching apparatus of claim 20 wherein, said sockets are generally rectangularly shaped with a narrow slotted end wall aligned with the actuator and extended in the direction of the rectilinear actuator movement and with deep side walls projecting outwardly to the exterior of the housing unit, said actuator being a strip-like member having a pair of spaced coupling openings defining said coupling means, said contact units having the actuating arm pivotally mounted and projecting through said slotted end wall into one of said coupling openings, each contact unit having unit side walls deeper than socket side walls and having a pair of generally L-shaped bayonet recesses projecting from the end wall of the contact unit and laterally spaced from each other and correspondingly spaced from the adjacent end walls, and spring loaded latch plates slidably mounted in the housing unit and passing through the sockets immediately adjacent the side walls and having inwardly projecting locking pins, one for each of said sockets and engageable with an aligned bayonet recess of the contact unit.

References Cited

UNITED STATES PATENTS

| | | | |
|---|---|---|---|
| 3,238,329 | 3/1966 | Russo | 335—132 |
| 3,253,092 | 5/1966 | Landow | 335—132 |
| 3,324,431 | 6/1967 | Cataldo et al. | 335—132 |

BERNARD A. GILHEANY, *Primary Examiner.*

H. BROOME, *Assistant Examiner.*